United States Patent
Rud et al.

(10) Patent No.: US 6,779,402 B2
(45) Date of Patent: Aug. 24, 2004

(54) METHOD AND APPARATUS FOR MEASURING ACCELERATION USING A FIBER OPTIC ACCELEROMETER

(75) Inventors: Mayer Rud, Calabasas, CA (US); James Arroyo, Granada Hills, CA (US); Michael J. Tweedy, Simi Valley, CA (US)

(73) Assignee: Northrop Grumman Corporation, Woodland Hills, CA (US)

( * ) Notice: Subject to any disclaimer, the term of this patent is extended or adjusted under 35 U.S.C. 154(b) by 0 days.

(21) Appl. No.: 10/273,611

(22) Filed: Oct. 18, 2002

(65) Prior Publication Data

US 2004/0074299 A1 Apr. 22, 2004

(51) Int. Cl.$^7$ ............................................. G01P 15/08
(52) U.S. Cl. ............................. 73/514.26; 73/514.27; 73/653
(58) Field of Search .................. 73/514.26, 514.27, 73/653, 657, 655; 367/149; 385/13

(56) References Cited

U.S. PATENT DOCUMENTS

| | | | | |
|---|---|---|---|---|
| 4,534,222 A | * | 8/1985 | Finch et al. ................ | 73/653 |
| 5,134,882 A | * | 8/1992 | Taylor ....................... | 73/514.26 |
| 6,363,786 B1 | | 4/2002 | Fersht ....................... | 73/514.26 |

FOREIGN PATENT DOCUMENTS

| | | |
|---|---|---|
| EP | 0 419 173 A1 | 3/1991 |
| GB | 2 189 110 A | 10/1987 |

OTHER PUBLICATIONS

Pechstedt, R.D., "Performance analysis of a fiber optic accelerometer based on a compliant cylinder design," Review of Scientific Instruments Jan. 1995, No. 1., PT 1, pp. 207–214.

* cited by examiner

Primary Examiner—John E. Chapman

(57) ABSTRACT

A system and method for measuring acceleration using a fiber optic accelerometer having a pair of fiber optic coils positioned around a deformable support structure. The support structure possesses a nominally cylindrical shape with the fiber optic coils being wound around opposite ends of the cylindrical support structure from each other. The support structure deforms from its nominally cylindrical shape to a conical shape in response to acceleration along a sensing axis. The changing shape of the support structure causes one of the fiber optic coils to expand while the other of the fiber optic coils contracts. The fiber optic coils are included in an interferometer such that acceleration along the sensing axis produces a phase difference between light signals propagating in the fiber optic coils resulting from their expansion and contraction.

25 Claims, 4 Drawing Sheets

FIG. 3
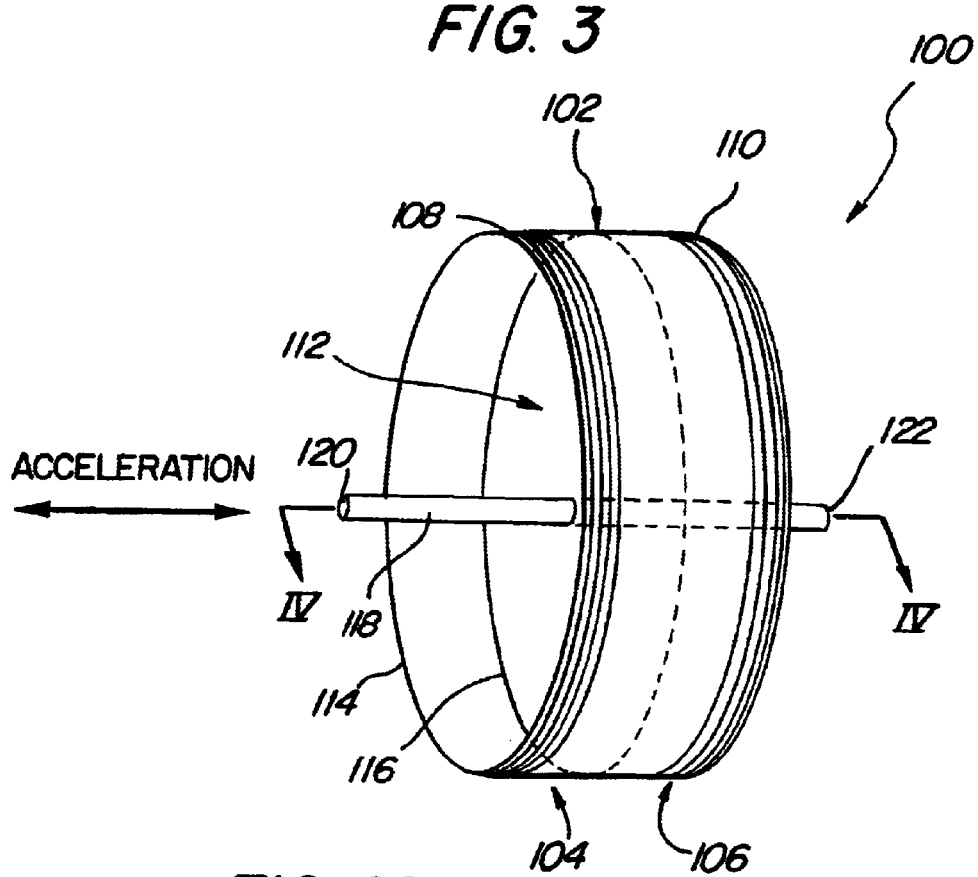
FIG. 4A 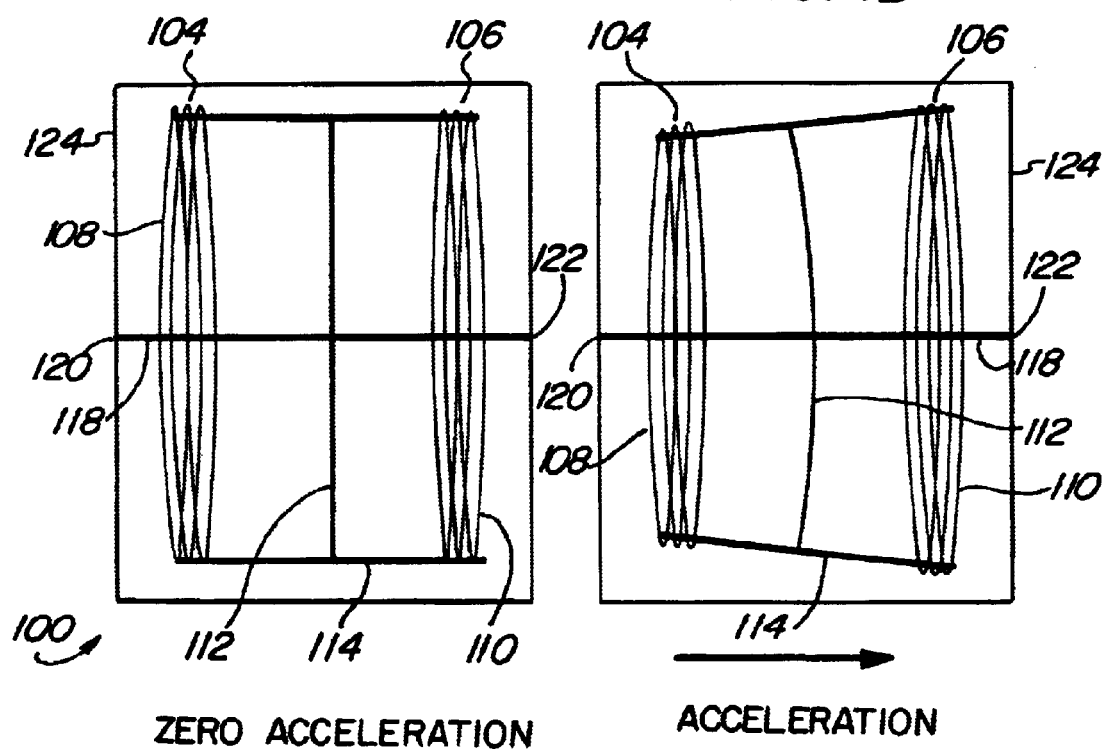 FIG. 4B
ZERO ACCELERATION     ACCELERATION

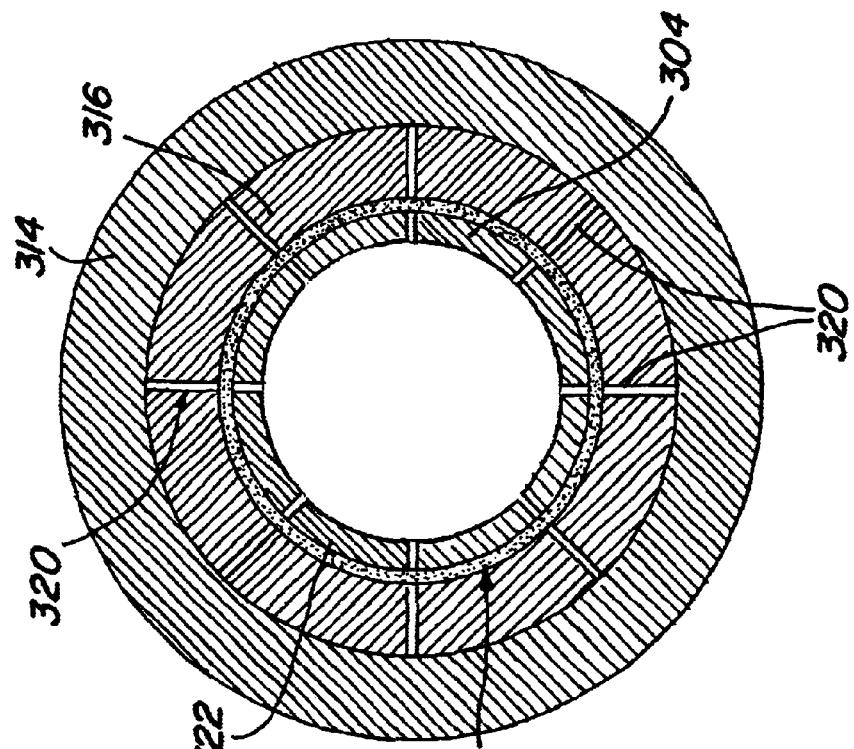
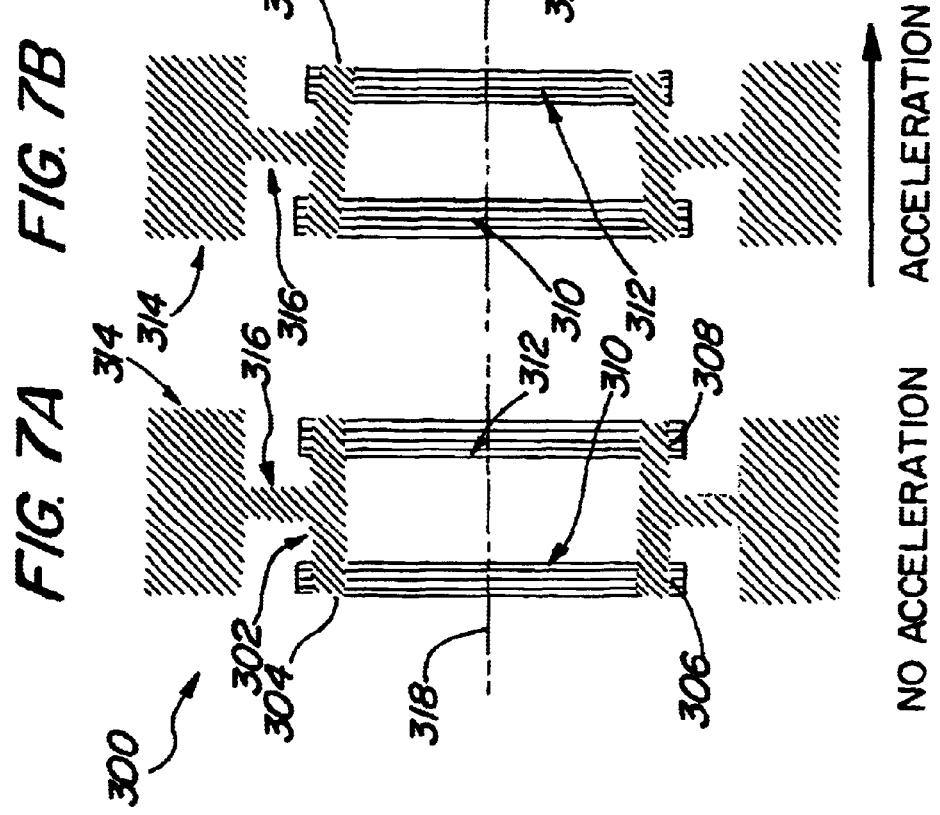

METHOD AND APPARATUS FOR MEASURING ACCELERATION USING A FIBER OPTIC ACCELEROMETER

BACKGROUND OF THE INVENTION

1. Field of the Invention

The present invention relates generally to measuring acceleration using optical measurement by light interference, and more specifically to an improved fiber optic accelerometer for measuring acceleration by sensing acoustic waves.

2. Description of Related Art

The flexure or strain of a flexible disk or membrane is a well-known basis for measurements including acceleration and pressure, acceleration typically being measured by such flexure resulting from momentum forces acting on such a disk in a direction along its axis. The amount of flexure may be determined interferometrically, where interferometric measurements of strain can provide great resolution and, when carried out with an optical fiber, provide a simple and rugged sensor which requires low power, is immune to electromagnetic interference, and is adapted to remote sensing and to high data rates.

It is known to minimize operating condition errors by using a "push-pull" arrangement of a pair of complementary interferometer optical fiber legs such that a change in a measured variable shortens one leg and respectively lengthens the other leg. Light signals traveling through both legs are interfered with one another, where the corresponding amount of interference between the light signals is indicative of the change in length of each of the legs. In order to further increase the sensitivity of a fiber optic sensor legs, accelerometers have been developed where the optical fiber 10 is wound into a spiral 12 and affixed to a side of a membrane 14, as shown in FIG. 1.

Further accelerometer designs have attached such fiber optic wound coils to both sides of the deformable membrane. Each optical fiber coil serves as one leg of an interferometer. Referring to FIG. 2, in these sensor designs, each side of an elastic and circumferentially-supported or axially-supported membrane 20 is spirally wound with coils 22a, 22b of optical fiber fixedly attached to the membrane sides 24a, 24b. As a result of this construction, flexure of the membrane expands such a coil on one side of the membrane and contracts such a coil on an oppositely facing side. The membrane disk 20 acts as a type of a spring which is deformed by inertial force resulting from acceleration due to an external force, such as an acoustic wave traveling in a liquid. The membrane is mounted on a body so that an acoustic pressure differential to be measured exists across the membrane, the spiral coils then being connected for push-pull operation as two legs of a fiber optic interferometer to provide an output corresponding to the flexure resulting from acceleration.

In such conventional accelerometers utilizing wound fiber optic coils, the optical fiber is wound in a spiral fashion starting with coils having a rather small diameter at the center of the membrane with a progressively increasing diameter toward the membrane periphery. This arrangement presents several significant difficulties with its use. Initially, the disparity in the diameter of the windings of the optical fiber coil make it difficult to select an appropriate grade of optical fiber. The smaller diameter windings of the coil near the center of the membrane cause light leak when the bend radius is smaller than a particular optical fiber specification. This constrains the design geometry as well as limits the optical fiber selection to specialty fibers having small bend diameter specifications, which also tend to have a prohibitively high cost for many applications.

A second difficulty associated with use of a wound fiber optic coil comes from the way the optical fiber is spirally wound and attached to the membrane, such that the inner windings and the outer windings of the fiber spiral are deformed differently in response to the membrane deformation. For example, in the case of a peripherally supported membrane attached to a rigid housing, the unrestrained center portion of the membrane will deform more than the periphery of the membrane from inertial lag in response to the external force. This causes the outer windings of the coils to deform only slightly so that they do not contribute much to the overall optical path difference, thus making inefficient use of the optical fiber.

A third difficulty resides in the manufacturing of the fiber optic coil. The winding of an optical fiber to produce a coil of this geometry is a complex procedure, where an uneven wind may result even when the utmost of care is taken. There is also an associated loss for the optical fiber each time it crosses over the adjacent windings of other layer of windings in the fiber optic coil. Further, the wound coil in this design requires its subsequent direct attachment to the membrane, whose inherent stiffness absorbs a greater portion of the flexural strain, thereby reducing the available strain energy that could otherwise be directly transferred to the fiber causing a further loss of efficiency and corresponding reduction in sensor sensitivity.

SUMMARY OF THE INVENTION

The foregoing shortcomings and disadvantages of the prior art are alleviated by the present invention that provides a fiber optic accelerometer having a pair of fiber optic coils positioned around a deformable support structure. The support structure possesses a nominally cylindrical shape with the fiber optic coils being wound around opposite ends of the cylindrical support structure from each other. The support structure deforms from its nominally cylindrical shape to a conical shape in response to acceleration along a sensing axis. The changing shape of the support structure causes one of the fiber optic coils to expand while the other of the fiber optic coils contracts. The fiber optic coils are included in an interferometer such that acceleration along the sensing axis produces a phase difference between light signals propagating in the fiber optic coils resulting from their expansion and contraction.

BRIEF DESCRIPTION OF THE DRAWINGS

The features of the present invention, which are believed to be novel, are set forth with particularity in the appended claims. The present invention, both as to its organization and manner of operation, together with further advantages, may best be understood by reference to the following description, taken in connection with the accompanying drawings in which the reference numerals designate like parts throughout the figures thereof and wherein:

FIG. 3 is a perspective view of a preferred embodiment of a fiber optic accelerometer formed in accordance with the present invention;

FIGS. 4A and 4B are cross-sectional views of the fiber optic accelerometer of FIG. 3 taken generally along lines IV—IV;

FIGS. 7A and 7B are cross-sectional side views of yet another preferred embodiment of a fiber optic accelerometer formed in accordance with the present invention; and FIG. 8 is a cross-sectional end view of the fiber optic accelerometer of FIGS. 7A and 7B.

DETAILED DESCRIPTION OF THE PREFERRED EMBODIMENTS

Figure 1:
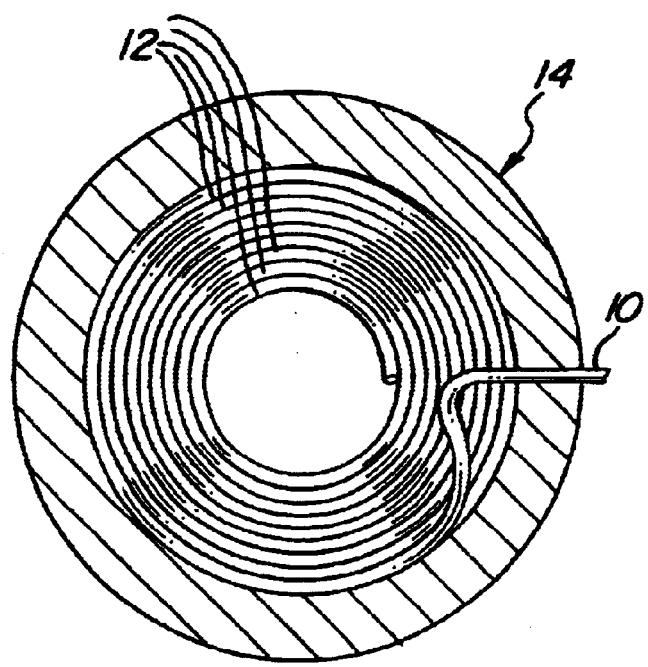
FIG. 1 is a side view of a conventional accelerometer having an optical fiber wound coil affixed to a flexible membrane.
Figure 2:
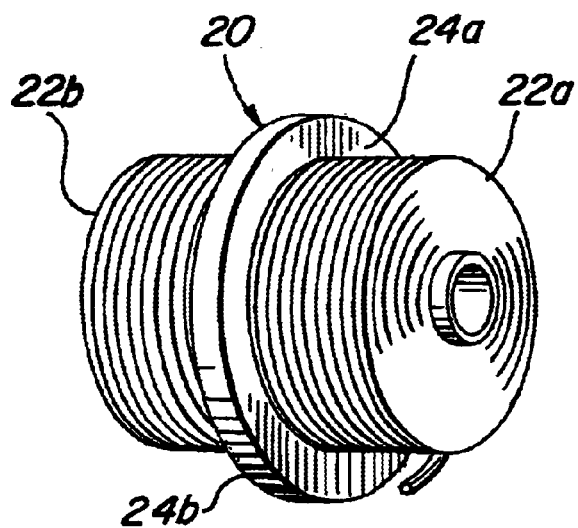
FIG. 2 is a perspective view of a conventional accelerometer having optical fiber wound coils affixed to both sides of a flexible membrane.

The following description is provided to enable any person skilled in the art to make and use the invention and sets forth the best modes contemplated by the inventors of carrying out their invention. Various modifications, however, will remain readily apparent to those skilled in the art, since the general principles of the present invention have been defined herein specifically to provide an improved fiber optic accelerometer.

FIG. 3 is perspective view of a preferred embodiment of a fiber optic accelerometer 100 formed in accordance with the present invention. The accelerometer 100 includes a support structure 102 having support areas 104 and 106 about which a pair of spiral-wound optical fiber coils 108 and 110 are respectively formed. The support structure 102 includes a flexible membrane 112 and an outer rim 114 which are deformable by inertial forces. The outer rim 114 preferably possesses a nominally cylindrical shape where a periphery 116 of the membrane 112 is attached to an inner surface of the outer rim 114. The support areas 104 and 106 are located portions of the outer rim 114 located opposite sides of the membrane 112 from each other.

The membrane 112 is supported axially by a rod-like hub 118 which extends through the membrane 112 extending along a central axis of the outer rim 114 in a direction in which the acceleration is to be measured. The membrane 112 is rigidly connected to the outer rim 114 such that an angle exists between the membrane 112 and the outer rim 114 that is substantially maintained at all times, wherein such angle is preferably 90° but may also comprise other angles. Opposite ends 120 and 122 of the hub 118 are attached to a housing 124 (shown in FIG. 4). When an external force, such as an acoustic wave in a acting on the accelerometer 100, is applied either directly to the hub 118 or indirectly to the hub 118 through the housing 124, the hub 118 moves in response to this external force and, in turn, pulls the membrane 112 and causes the membrane 112 to flex. Since the angle between the membrane 112 and the outer rim 114 is substantially maintained constant at all times, the flexure of the membrane 112 causes the outer rim 114 to deform from its nominally cylindrical shape to a conical shape.

Referring now to FIGS. 4A and 4B, a cross-section side view of the fiber optic accelerometer of FIG. 3 is illustrated when experiencing zero acceleration (FIG. 4A) and when experiencing some acceleration (FIG. 4B). When experiencing zero acceleration, the membrane 112 substantially maintains a fixed angle with respect to both the hub 118 and the outer rim 114. When an external force is applied to the hub 118, the acceleration along the axial direction of the hub 118, shown by directional arrow 119, will cause the membrane 112 to flex or deform, as shown in FIG. 4B. The rigid connection between the membrane 112 and the outer rim 114 will then cause the outer rim 114 to deform in response to the flexure of the membrane 112 to assume a weak conical shape.

As a result of the deformation of the shape of the outer rim 114, the diameter of one of the support areas 104 and 106 will be increased while the diameter of the other of the support areas 104 and 106 will correspondingly be reduced, such that the changing diameters of the support areas 104 and 106 are inversely proportional with respect to each other. The fiber optic coils 108 and 110 which are respectively positioned around the support areas 104 and 106 will thus be subjected to elongation on one side of the outer rim 114 and to contraction on the other side of the outer rim 114 in response to the changing diameters of the support areas 104 and 106. This elongation and contraction of the fiber optic coils 108 and 110 causes an acceleration-induced difference in the lengths of the optical fiber in the fiber optic coils 108 and 110. These length changes result in a phase difference between light signals propagating in the fiber optic coils 108 and 110, thus causing the light signals to interfere either constructively or destructively with each other.

The amount of interference may be detected by configuring the optical paths of the accelerometer 100 to act as an interferometer. As shown in block diagram of FIG. 5, the system 200 for measuring acceleration using the interferometer 100 as an interferometer uses each of the fiber optic coils 108 and 110 as one leg of the interferometer. A light source 202 is arranged to deliver a light signal to the accelerometer 100, wherein a beam splitter 204 (e.g., a 2×2 optical coupler or other similar device) is used to split the light signal into two equal signals which are respectively delivered to propagate through fiber optic coils 108 and 110. Any wavelength of light may be utilized in the present invention. After traversing the fiber optic coils 108 and 110, the light signals reflect from mirrors 206 and 208, respectively, and make a second pass through fiber optic coils 108 and 110. While propagating through the fiber optic coils 108 and 110, an acceleration-dependent phase shift occurs between the light signals guided by the fiber optic coils 108 and 110 due to their respective expansion and contraction. This phase shift produces an interference when the light signals are combined by the beam splitter or coupler 204. The combined optical signals are then fed via a fiber optic cable to a photodetector 210 or other similar device, which produces electrical signals corresponding to the acceleration experienced by the accelerometer 100 along a direction of its central axis.

Figure 5:
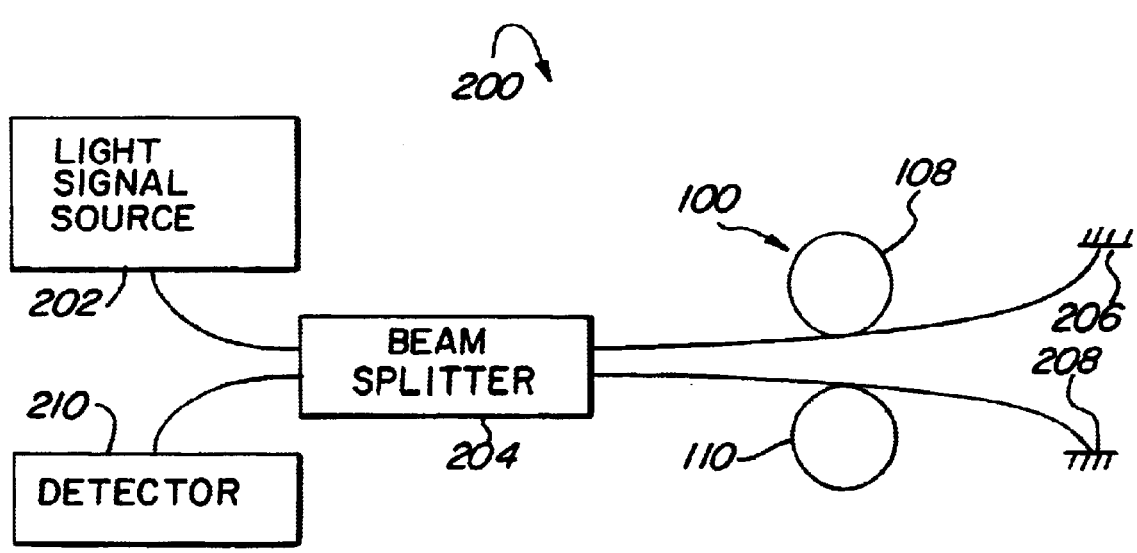
FIG. 5 is a block schematic illustration of an interferometer structure that may be used in connection with the fiber optic accelerometer of the present invention.

The system 200 configuration shown in FIG. 5 makes use of a Michelson interferometer. The interferometer arrangement has the advantage of only requiring a single input lead into the accelerometer 100. However, various interferometer arrangements are well-known in the art, and it is the intention of the inventors of the present invention that the system 200 may be readily modified to utilize any of such other interferometer arrangements in connection with the accelerometer 100 of the present invention.

Each of the fiber optic coils 108 and 110 are spirally-wound under tension onto and attached to the respective support areas 104 and 106 of the cylindrical outer rim 114 to preferably form coil having at least one layer of windings. When formed with a single layer of windings, the windings will possess a substantially uniform diameter about the periphery of the outer rim 114. This arrangement of the fiber optic coils 108 and 110 having a uniform diameter makes construction of the fiber optic coils 108 and 110 much simpler than the formation of conventional fiber optic coil packs having multiple layers of windings which involved a very complex procedures and typically yielded varying results from wound coil pack to wound coil pack. The relatively uniform diameter of the windings of the fiber optic coils 108 and 110 makes their formation easily reproducible in a consistent and reliable manner.

Furthermore, conventional wound fiber optic coil packs having multiple layers of windings possessed windings with varying diameters, where the windings closest to the center of the coils had very small diameters, resulting in light leak when the bend radius of the optical fiber was too great or required extremely expensive high grade optical fiber with small bend diameter specifications. To the contrary, the fiber optic coils 108 and 110 of the present invention are wound around the relatively large diameter of the outer rim 114, advantageously minimizing the chances for light leak due to the large bend radius and allowing low cost, standard optical fiber to be utilized.

By utilizing fiber optic coils 108 and 110 of all substantially the same diameter, the present invention further allows the lengths of both legs of the interferometer to be closely matched with each other. This arrangement also allows both sets of coils 108 and 110 to be precisely positioned the same distance from the membrane 112. These factors all lead to an improved design optimization, which can reduce the amount of fiber required to form the fiber optic coils 108 and 110. The distance between the windings in each of the fiber optic coils 108 and 110 may be variably selected to optimize the sensitivity and performance of the accelerometer 100.

All of the these advantageous results produced by the accelerometer 100 of the present invention are especially important when the accelerometer 100 is utilized as a hydrophone within an array of hydrophone sensor used in measuring acoustic waves in a liquid. The housing for each hydrophone is accelerated by the force of an acoustic wave acting on the housing, where the acceleration of the housing can then be measured in accordance with the teachings of the present invention. The output from the entire array of hydrophones is then processed to determine specific information about the acoustic wave being measured. In order accurately process this information, each of the hydrophones should possess a uniform response. This makes it imperative that the hydrophones be able to be exactly reproduced to possess the desired uniform response, which the various advantages of the accelerometer 100 of the present invention allow to be achieved.

Further, the fiber optic coils 108 and 110 in the accelerometer 100 of the present invention are mounted on the outer rim 114 of the support structure 102 and are not mounted directly on the surface of the membrane. This allows the geometry of the membrane 112 to be optimized for the desired performance characteristics of the accelerometer 100, such as by using the membrane 112 to control the resonance of the accelerometer 100.

Figure 6:
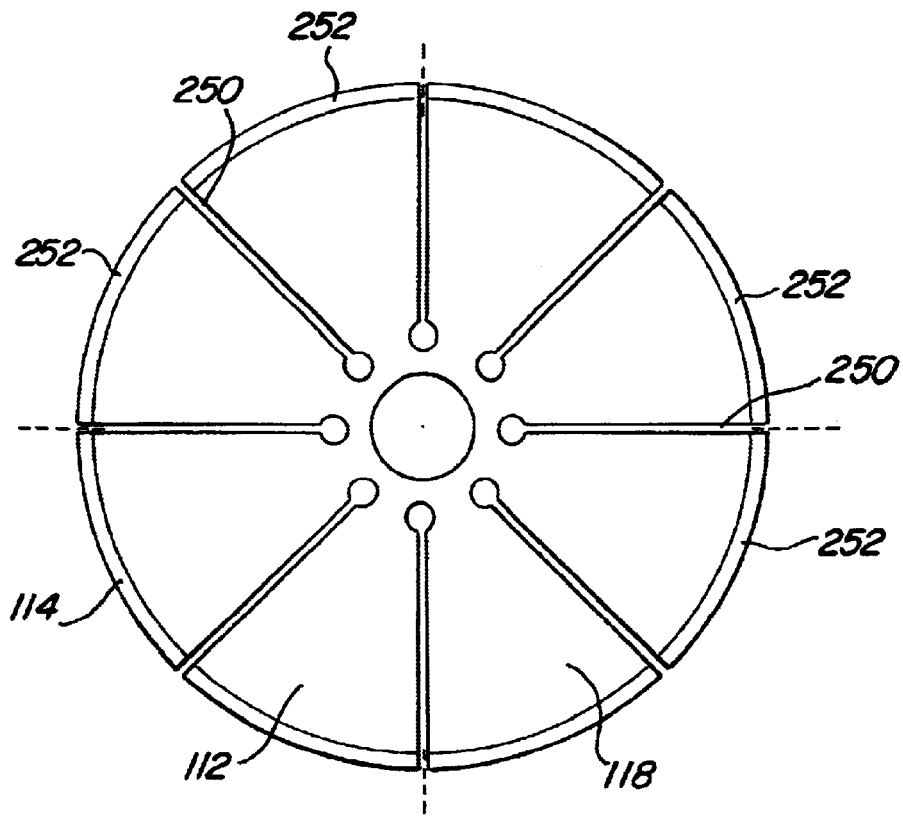
FIG. 6 is an end view of another preferred embodiment of a fiber optic accelerometer formed in accordance with the present invention.

One way the geometry of the membrane 112 may be optimized is by forming radial slits 250 in the membrane 112 and outer rim 114, as shown in the end view of another preferred embodiment of the accelerometer 100 in FIG. 6. In this embodiment, the membrane 112 and the outer rim 114 are machined to form radially extending slits 250 which separate the outer rim 114 into a plurality of rim elements 252 which are spaced apart from one another by the slits 250. The rim elements 252 remain rigidly connected to the membrane 112 so as to substantially maintain their formation angle with respect to the membrane 112 at all times. When an external force is applied to the hub 118, the membrane 112 flexes causing a rim element 252 to tilt. The combined result of the tilt of all of the rim elements 252 causes the nominally cylindrical shape of the outer rim 114 to assume a weak conical shape. The slits 250 are preferably equally spaced from each other about the periphery of the outer rim 114 so that each of the rim elements 252 will tilt in substantially the same manner in response to the deformation of membrane 112. The slits 250 may alternatively be formed only in the outer rim 114 and not within the membrane 112. The particular location, quantity, and spacing of the slits 250 may be variably chosen based upon the desired performance characteristics.

In another preferred embodiment of the present invention, the support structure of the accelerometer is peripherally supported instead of being axially supported. Referring now to FIG. 7A, a cross-sectional side view of an accelerometer 300 having a peripheral-supported support structure 302 formed in accordance with another preferred embodiment of the present invention is illustrated. The support structure 302 comprises a rim 304 of a nominally cylindrical shape having support areas 306 and 308 at opposite ends of the rim 304 for respectively supporting a pair of fiber optic coils 310 and 312 which are spirally-wound around the rim 304. The rim 304 is attached to an outer housing or frame 314 by an annular flex ring 316 which circumferentially extends around a periphery of the rim 304. The flex ring 316 may either be integrally formed with the rim 304 as a single piece having a T-shaped cross-sectional shape or may be formed separately and rigidly attached to the rim 304. A rigid connection maintains a substantially constant angle between the rim 304 and the flex ring 316 at all times, even during acceleration. The flex ring 316 is attached to the housing 314 in such a manner that allows the flex ring 316 to flex with respect to the housing 314.

When an external force is applied to the housing 314, the acceleration of the housing along the central axis 318 of the rim 304 will cause the flex ring 316 to inertially flex or deform, as shown in FIG. 7B. The rigid connection between the flex ring 316 and the rim 304 will then cause the rim 304 to deform in response to the flexure of the flex ring 316 to assume a weak conical shape. The support areas 306 and 308 possess the same nominal uniform diameter of the rim 304 when not experiencing acceleration. When the rim 304 assumes a conical shape in response to acceleration, the diameter of one of the support areas 306 and 308 will increase while the diameter of the other of the support area 306 and 308 will be reduced based upon the direction of acceleration. The changing diameters of the support areas 306 and 308 will, in turn, cause the fiber optic coils 310 and 312 on opposite ends of the rim 304 to expand and contract, respectively, in a push-pull fashion.

In another preferred embodiment of the present invention, radial slits 320 may be formed in the rim 304 and/or the flex ring 316 in order to facilitate the deformation of the rim 304 to a conical shape in response to acceleration, as shown in the cross-sectional end view of FIG. 8. In this embodiment, the rim 304 is machined to form radially extending slits 320 which separate the rim 304 into a plurality of rim elements 322 which are spaced apart from one another by the slits 320. The slits 320 may optionally further extend radially into the flex ring 316 to further facilitate the expansion and contract of the ends of the rim 304. The rim elements 322 are rigidly connected to the flex ring 316 so as to substantially maintain their formation angle with respect to the flex ring 316 at all times. When an external force is applied to the housing 314, the flex ring 316 flexes causing a rim element 322 to tilt. The combined result of the tilt of all of the rim elements 322 causes the nominally cylindrical shape of the rim 304 to assume a conical shape. The slits 320 are preferably equally spaced from each other about the periphery of the rim 304 so that each of the rim elements 322 will tilt in substantially the same manner in response to the deformation of flex ring 316.

As can be seen from the foregoing, the improved fiber optic accelerometer formed in accordance with the various embodiments of the present invention provides a simple, cost-effective, efficient, and consistently reproducible manner of winding optical fiber into coils in the accelerometer. Moreover, a fiber optic accelerometer formed in accordance with the present invention eliminates the requirement of expensive, high grade, low loss optical fibers that can function at very small bend radii, where more economical optical fiber having a larger bend radius may be utilized in the fiber optic coils of the accelerometer of the present invention. The larger bend radius of the coils further assist in preventing light leak during propagation through the coils. Still further, the accelerometer of the present invention allows the sensitivity and performance of the accelerometer to be optimized by freeing the acceleration-sensitive membrane from having fiber optic coils attached thereto.

In each of the above embodiments, the different structures of the improved fiber optic accelerometer of the present invention are described separately in each of the embodiments. However, it is the full intention of the inventors of the present invention that the separate aspects of each embodiment described herein may be combined with the other embodiments described herein. Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. A fiber optic accelerometer, comprising:
   a housing;
   a support structure having a nominally cylindrical shape which is deformable to a conical shape in response to acceleration, mounted within said housing having a first support area and a second support area for mounting optical fibers respectively around a periphery thereof such that said peripheries of said first and second support areas have dimensions which change in response to acceleration;
   a first optical fiber positioned on said first support area of said support structure; and
   a second optical fiber positioned on said second support area of said support structure.

2. The fiber optic accelerometer of claim 1, wherein the changes to said periphery of said first support area in response to acceleration are inversely proportional to the changes to said periphery of said second support area, such that one of said peripheries of said first and second support areas will contract while the other of said peripheries of said first and second support areas will expand in response to acceleration.

3. The fiber optic accelerometer of claim 1, wherein said cylindrical support structure includes an annular ring extending about an outer surface of said support structure which connects said support structure to said housing.

4. The fiber optic accelerometer of claim 3, wherein said annular ring flexes to allow said support structure to move with respect to said housing in response to acceleration.

5. The fiber optic accelerometer of claim 4, wherein said annular ring is more rigidly attached to said support structure than to said housing in order to facilitate deformation of said support structure to a conical shape in response to acceleration.

6. The fiber optic accelerometer of claim 1, wherein each of said first and second optical fibers are spirally wound into fiber optic coils, each of said fiber optic coils having at least one layer of windings of a substantially uniform diameter when not experiencing acceleration.

7. The fiber optic accelerometer of claim 6, wherein said fiber optic coils expand and contract in conjunction with the respective changes to said dimensions of said first and second support areas of said support structure in response to acceleration.

8. A fiber optic accelerometer comprises:
   a housing;
   a support structure having a membrane which flexes in response to acceleration and a substantially cylindrical outer rim having an inner surface which is attached to an outer periphery of the membrane, the support structure mounted within the housing and further having a first support area and a second support area for mounting optical fibers respectively around a periphery thereof such that said peripheries of said first and second support areas have dimensions which change in response to acceleration;
   a first optical fiber positioned on said support structure; and
   a second optical fiber positioned on said second support area of said support structure.

9. The fiber optic accelerometer of claim 8, wherein said membrane is rigidly attached to said outer rim such that flexure of said membrane causes said cylindrical outer rim to deform to a substantially conical shape.

10. The fiber optic accelerometer of claim 8, further comprising a hub axially extending through a center of said outer rim and further extending through said membrane, said membrane being affixed to said hub, said hub including two opposing ends which are each respectively attached to said housing.

11. The fiber optic accelerometer claim 8, wherein said first and second support areas are located on portions of said outer rim on opposite sides of said membrane from each other.

12. A fiber optic accelerometer comprising:
    a housing;
    a support structure mounted within said housing having a first support area and a second support area for mounting optical fibers respectively around a periphery thereof such that said peripheries of said first and second support areas have dimensions which change in response to acceleration, said support structure having slits formed therein for facilitating the expansion and contraction of said first and second support areas;
    a first optical fiber positioned on said first support area of said support structure; and
    a second optical fiber positioned on said second support area of said support structure.

13. The system of claim 12, wherein said support structure comprises:
    a membrane which flexes in response to acceleration; and
    a substantially cylindrical outer rim having an inner surface which is attached to an outer periphery of said flexible membrane.

14. The system of claim 13, wherein said membrane is rigidly attached to said outer rim such that flexure of said membrane causes said cylindrical outer rim to deform to a substantially conical shape.

15. The system of claim 13, further comprising a hub axially extending through a center of said outer rim and further extending through said membrane, said membrane being affixed to said hub, said hub including two opposing ends which are each respectively attached to a housing.

16. The system of claim 13, wherein said first and second support areas are located on portions of said outer rim on opposite sides of said membrane from each other.

17. A system for measuring acceleration using a fiber optic accelerometer, comprising:
a light source for generating light signals;
a fiber optic accelerometer for receiving said light signals, said accelerometer including:
a support structure having a nominally cylindrical shape which is deformable to a conical shape in response to acceleration, and
a first support area and a second support area for mounting optical fibers respectively around a periphery thereof such that said peripheries of said first and second support are have dimensions which change in response to acceleration,
a first optical fiber positioned on said first support area of said support structure for propagating a received light signal;
a second optical fiber positioned on said second support area of said support structure for propagating a received light signal; and
a detector for detecting the light signals propagating through said first and second optical fibers and generating an output indicative of acceleration.

18. The system of claim 17, wherein the changes to said periphery of said first support area in response to acceleration are inversely proportional to the changes to said periphery of said second support area, such that one of said peripheries of said first and second support areas will contract while the other of said peripheries of said first and second support areas will expand in response to acceleration.

19. The system of claim 17, wherein said support structure further comprises slits formed therein for facilitating the expansion and contraction of said first and second support areas.

20. The system of claim 17, wherein said cylindrical support structure includes an annular ring extending about an outer surface of said support structure which connects said support structure to said housing.

21. The system of claim 20, wherein said annular ring flexes to allow said support structure to move with respect to said housing in response to acceleration.

22. The system of claim 21, wherein said annular ring is more rigidly attached to said support structure than to said housing in order to facilitate deformation of said support structure to a conical shape in response to acceleration.

23. The system of claim 17, wherein each of said first and second optical fibers are spirally wound into fiber optic coils, each of said fiber optic coils having a single layer of windings of a substantially uniform diameter when not experiencing acceleration.

24. The system of claim 23, wherein said fiber optic coils expand and contract in conjunction with the respective changes to said dimensions of said first and second support areas of said support structure in response to acceleration.

25. A method of measuring acceleration using a fiber optic accelerometer having a support structure that is deformable in response to acceleration, comprising:
positioning a pair of fiber optic coils around opposite ends of the support structure from one another for propagating light signals therethrough, wherein said support structure possesses a nominally cylindrical shape during a non-accelerated state;
deforming said support structure into a conical shape in response to acceleration;
expanding and contracting said pair of fiber optic coils, respectively, in response to the acceleration-induced conical shape of said support structure, wherein said expansion and contraction of said fiber optic coils causes a phase shift between light signals propagating in said first and second fiber optic coils; and
determining an acceleration based upon the phase shift between the light signals propagating in said first and second fiber optic coils.

* * * * *